United States Patent
Kawanishi et al.

[11] Patent Number: 5,959,862
[45] Date of Patent: *Sep. 28, 1999

[54] VARIABLE-RATE DATA ENTRY CONTROL DEVICE AND CONTROL METHOD

[75] Inventors: Toshiharu Kawanishi; Osamu Nomura; Tetsuro Nagashima; Takashi Iino; Shigeaki Okutani, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/390,223

[22] Filed: Feb. 16, 1995

[30] Foreign Application Priority Data

Feb. 18, 1994  [JP]  Japan .................................. 6-021382

[51] Int. Cl.$^6$ .................................................. G05B 19/42
[52] U.S. Cl. .......................... 364/188; 364/179; 364/172; 364/178
[58] Field of Search .................................... 364/178, 188, 364/179, 172, 200, 200.08; 455/300, 34.1, 54.1, 56.1, 116, 115, 126; 395/463, 441, 440, 456, 200.01, 200.03, 162; 345/98, 119, 38

[56] References Cited

U.S. PATENT DOCUMENTS

| | | | |
|---|---|---|---|
| 4,447,873 | 5/1984 | Price et al. | 364/200 |
| 4,864,301 | 9/1989 | Helferich | 347/110 |
| 4,893,302 | 1/1990 | Hemmady et al. | 370/60 |
| 4,922,493 | 5/1990 | Kase | 371/31 |
| 5,410,621 | 4/1995 | Haytt | 382/69 |
| 5,428,741 | 6/1995 | Ho et al. | 395/162 |
| 5,541,926 | 7/1996 | Saito et al. | 370/94.2 |

FOREIGN PATENT DOCUMENTS 228060  9/1989  Japan .

Primary Examiner—Paul P. Gordon
Assistant Examiner—Ramesh Patel
Attorney, Agent, or Firm—Staas & Halsey LLP

[57] ABSTRACT

When the number of pieces of data which are operated on by an operation unit per unit time is N times the number of pieces of data entered into a data entry section per unit time and the operation unit performs an operation on a data set consisting of K samples of data, the data set extraction starting positions on a data string entered into the data entry section are shifted by K/N samples. Each of data sets thus extracted from the data string is sent to the operation unit to be operated on. This configuration permits the precision of operations by the operation unit to be improved according to the ratio K/N without reducing the operation efficiency of the operation unit.

15 Claims, 14 Drawing Sheets

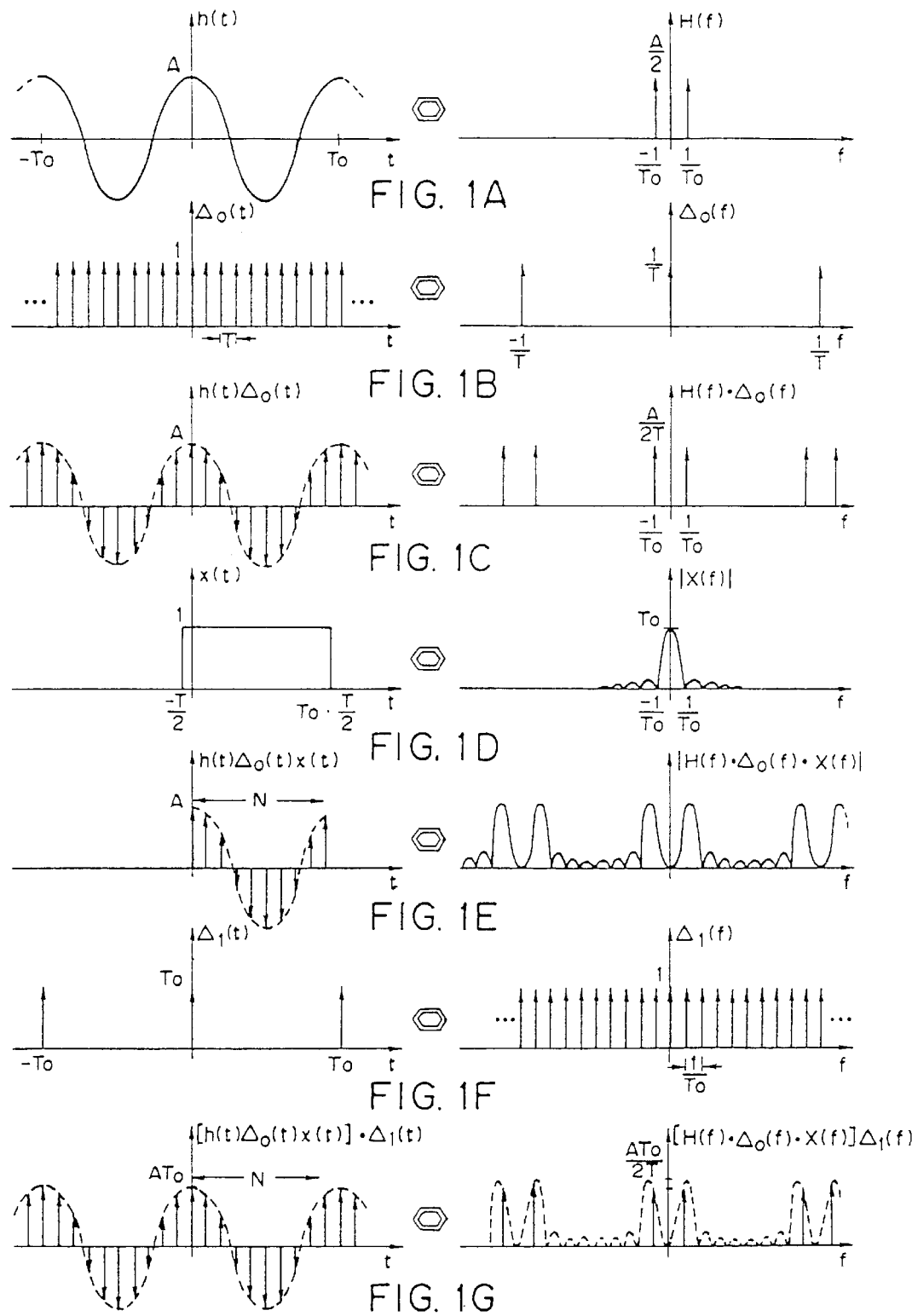

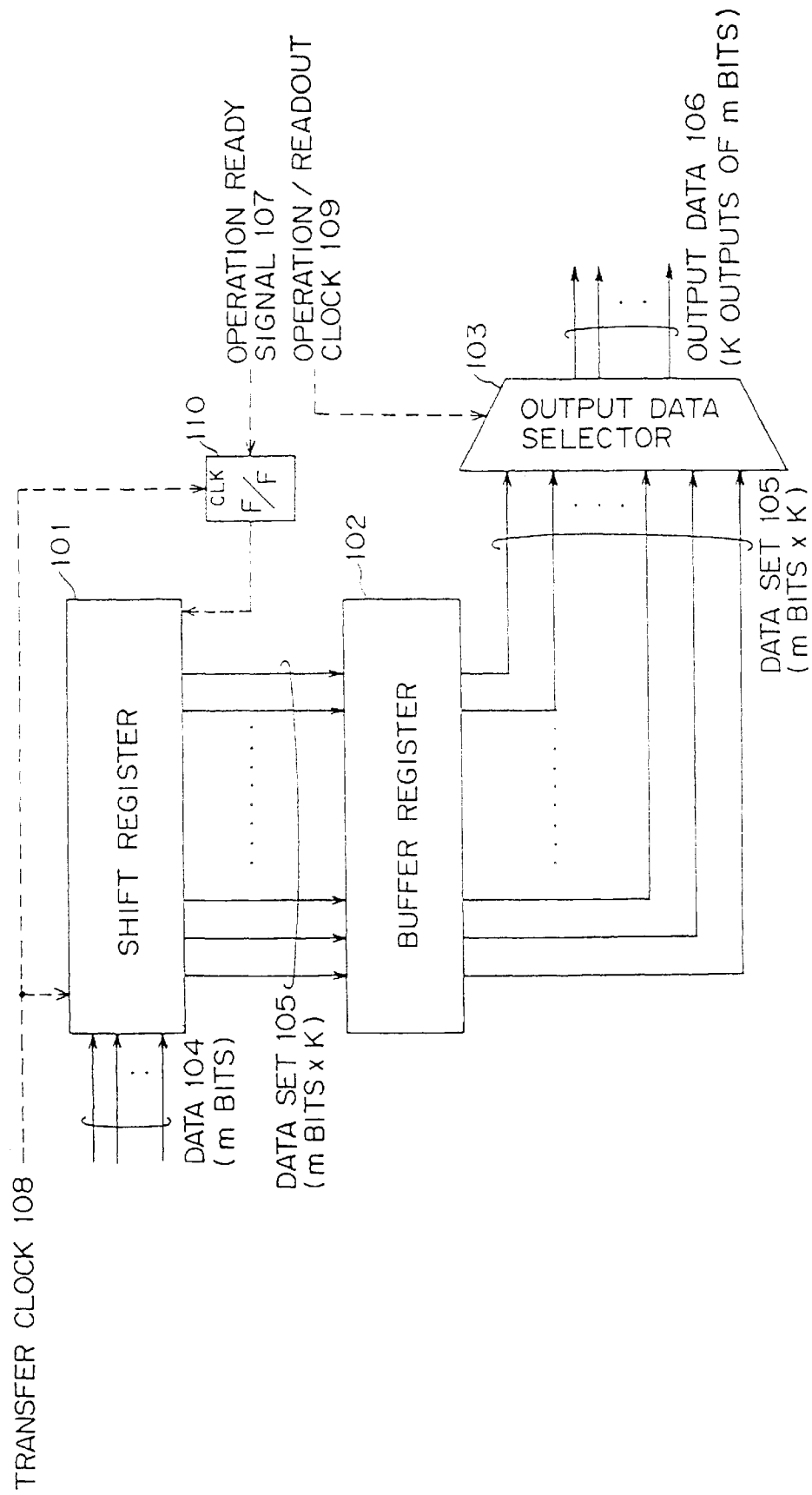
F I G. 3

K = 8 SAMPLES
[N = 1]

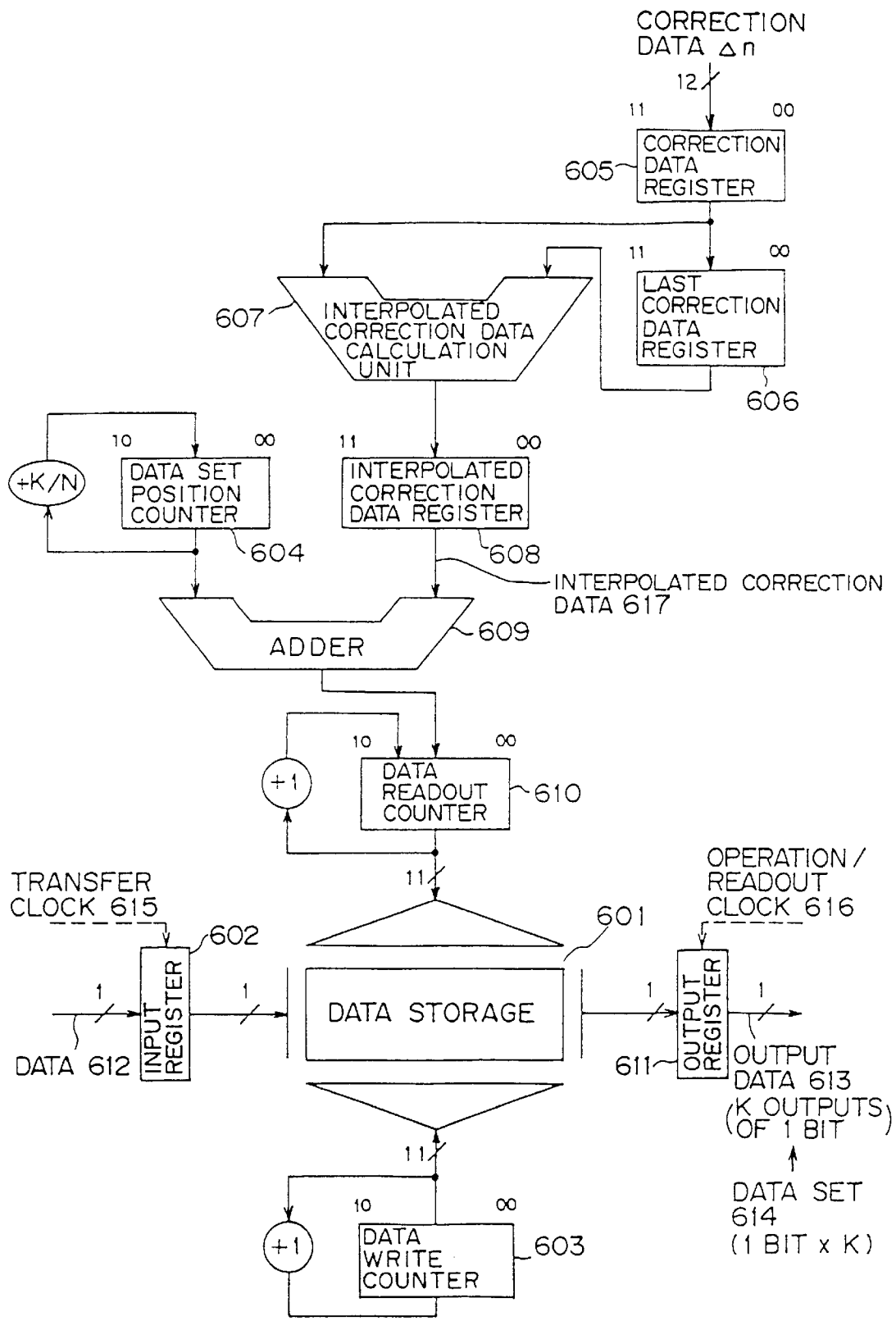
F I G. 13

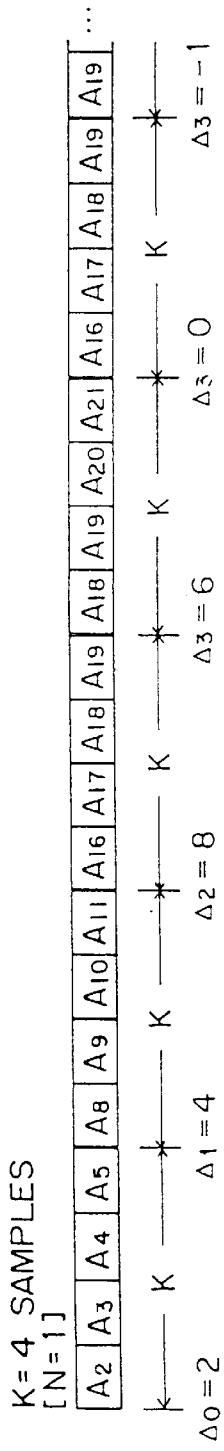
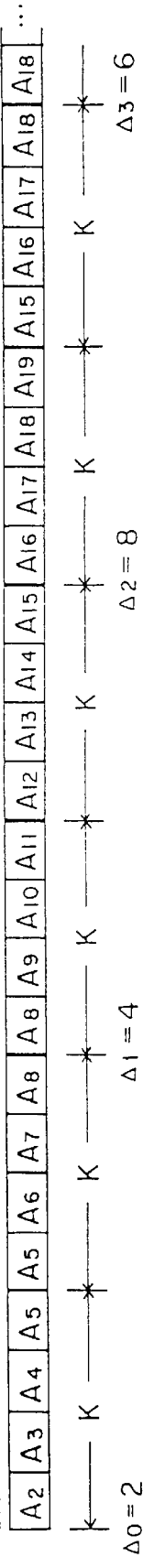
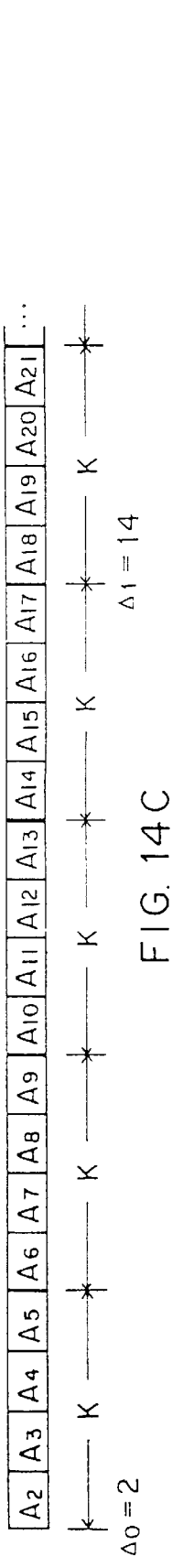
FIG. 14A
FIG. 14B
FIG. 14C

VARIABLE-RATE DATA ENTRY CONTROL DEVICE AND CONTROL METHOD

BACKGROUND OF THE INVENTION

1. Field of the Invention

The present invention relates to a data entry control device which causes an operation unit to perform efficient operations in the case where the data transfer rate of a continuous signal is identical to or lower than the speed with which the operation unit performs operations on the continuous signal and a control method therefor.

2. Description of the Related Art

In the field of recent signal processing systems, there is a requirement for a mode of signal processing in which a signal measuring instrument is carried aboard an aircraft, an operation processing unit is located on the ground, and a signal measured in the aircraft and transmitted to the ground and a signal measured by a ground signal measuring instrument are correlated in the ground operation unit using an operation such as fast Fourier transform (FFT).

In this mode, a continuous signal (analog signal) to be operated on is measured, then converted to a digital signal by an analog-to-digital converter in each of the signal measuring instruments. The resulting digital signals are then entered into the operation unit where an operation, such as FFT, is performed on the input signals.

If the signal measuring instruments for measuring signals to be operated on are changed, the transfer rate of data from the instruments to the operation unit may vary, depending on the type of signal measuring instrument. In such a case, it will be required to change the timing of operations in the operation unit.

In most cases, the signal measuring instrument aboard an aircraft is quite a distance from the signal measuring instrument located on the ground. Thus, considerable delay will be involved in transferring data to the ground, and the amount of delay will also vary widely because the speed of the aircraft is very high. For this reason, it is required to change the timing of operations in the operation unit in accordance with the amount of delay.

In a conventional signal processing system, the operation rate of the operation unit is synchronized with the transfer rate and the amount of delay of input data. This reduces the operation efficiency of the operation unit. As a result, the efficiency in use of the operation unit by other processing than the operation processing will also be decreased, thus reducing the processing performance of the whole system.

SUMMARY OF THE INVENTION

It is therefore an object of the present invention to prevent a reduction in the operation efficiency of an operation processing unit due to variations in the amount of delay and transfer rate of input data.

The present invention is arranged such that, if, when an operation unit performs an operation such as FFT on each of data sets consisting of K successive samples of data, the number of pieces of data which are operated on by the operation unit per unit time is N times the number of pieces of data which are entered into a shift register per unit time, one of data sets for which extraction positions on a data string are separated by K/N samples is transferred from the shift register to a buffer register each time the operation unit completes readiness to perform an operation on a new data set, and the data set is fed into the operation unit via an output data selector.

BRIEF DESCRIPTION OF THE DRAWINGS

FIGS. 1A to 1G are a diagram for use in explanation of discrete Fourier transform in which the width of a time window is equal to the period of a continuous waveform subjected to discrete Fourier transform;

FIG. 3 is a first block diagram illustrating the principle of the invention;

FIGS. 10A to 10D are a diagram for use in explanation of the operation of the first embodiment of FIG. 9;

FIG. 13 illustrates a third embodiment of the present invention; and

FIGS. 14A to 14C are a diagram for use in explanation of the operation of the third embodiment of FIG. 13.

DETAILED DESCRIPTION OF THE PREFERRED EMBODIMENTS

If the period of a continuous signal to be operated on is known, the original continuous waveform can be reproduced by making the width of a time window correspond with that period and sampling the signal. If, however, the period of a continuous waveform to be operated on is unknown, a difference will probably arise between the period of the continuous waveform and the width of a time widow. Such a difference will cause discontinuities at both ends of the time window, generating sidelobes.

Hereinafter, a description will be given of the cause of generation of the time-window-width-dependent sidelobes.

First, the case where the width of a time window is equal to the period of a continuous waveform will be described for better understanding.

The Fourier transform of a function $h(t)$ at the left of FIG. 1A is $H(f)$ at the right. At the right of each figure is shown the Fourier transform of a waveform at the left. For discrete Fourier transform, it is required to sample $h(t)$. At the left of FIG. 1B there is shown a train $\Delta_0(t)$ of sampling impulses at time intervals T, and an impulse function train $h(t)\Delta_0(t)$ obtained by multiplying the waveform $h(t)$ and the sampling impulse train is shown at the left of FIG. 1C.

A rectangular waveform $x(t)$ which is a time window equal in period to the continuous waveform $h(t)$ is shown at the left of FIG. 1D. Multiplication of the impulse function train of FIG. 1C and the rectangular waveform $x(t)$ results in a waveform, $h(t)\Delta_0(t)x(t)$, shown at the left of FIG. 1E, indicating that one period of a continuous waveform is represented by a sampled waveform of a finite length.

The Fourier transform of the sampled waveform of a finite length (at the left of FIG. 1E) is obtained by convolution of the impulse function train in frequency domain shown at the right of FIG. 1C and the sin f/f function in frequency domain shown at the right of FIG. 1D, and the resulting waveform is shown at the right of FIG. 1E. The product of the waveform shown in FIG. 1E and a sampling impulse train $\Delta_1(f)$ at frequency intervals $1/T_0$ shown in FIG. 1F means the convolution of the time functions shown in FIGS. 1E and 1F, and the resulting waveform is shown in FIG. 1G. Thus, it will be understood that the original continuous waveform can be reproduced by making the width of a time window equal to the period of a continuous signal.

Next, the case where the width of a time window and the period of a continuous signal are not equal to each other will be described.

Figure 2A:
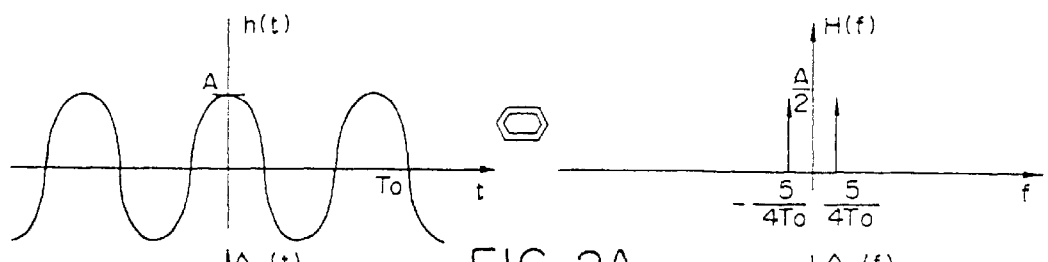
FIGS. 2A to 2G are a diagram for use in explanation of discrete Fourier transform in which the width of a time window is not equal to the period of a continuous waveform subjected to discrete Fourier transform.
Figure 2B:
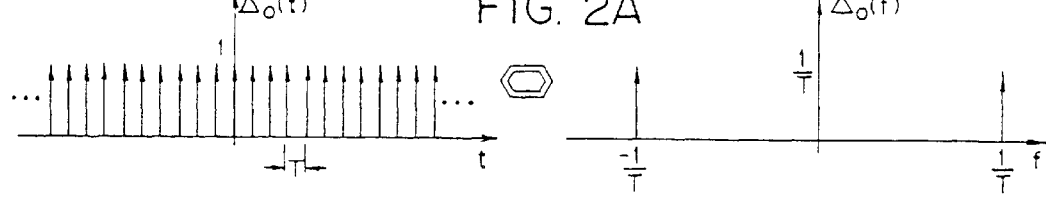
Figure 2C:
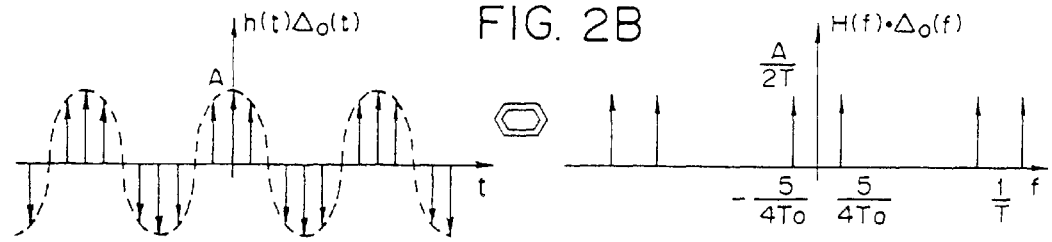
Figure 2D:
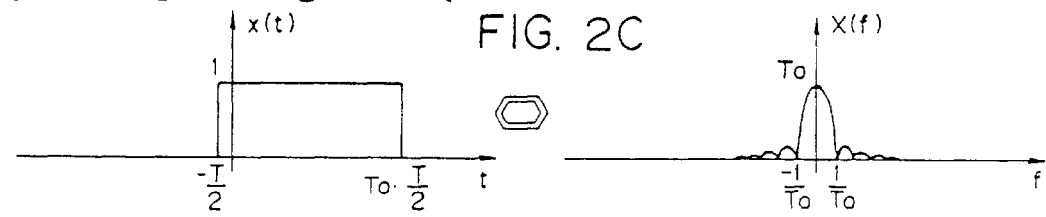
Figure 2E:
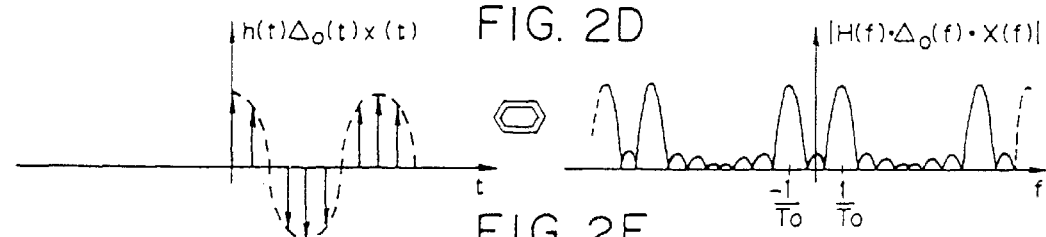
Figure 2F:
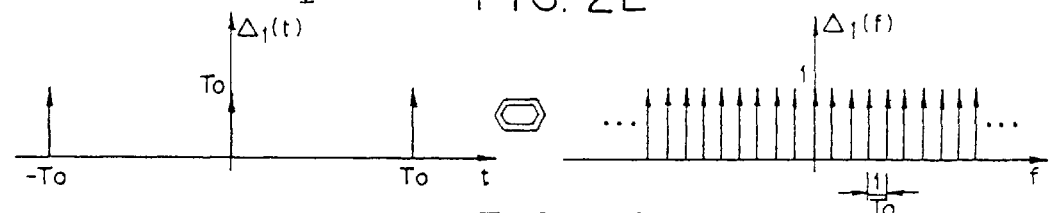
Figure 2G:
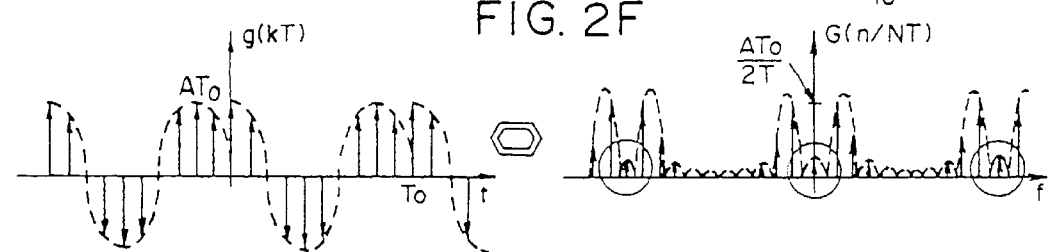

FIGS. 2A through 2G correspond to the case where the width of a time window is 5/4 times the period of a continuous waveform. Thus, a sampled waveform of a finite length has a period 5/4 times the period of the continuous waveform as shown in FIG. 2E. Consequently, the reproduced waveform will be accompanied by discontinuities at regular intervals separated by a period 5/4 times the period of the continuous waveform as shown at the left of FIG. 2G. Such abrupt changes in waveform in time domain will generate unwanted frequency components in frequency domain. The discontinuities cause sidelobes. When comparing the right of FIG. 2G with the right of FIG. 1G, it will be understood that sidelobes are produced in portions enclosed with circles in FIG. 2G.

The sidelobes will appear shifted a little when a time window is shifted a little. Therefore, if sampled waveforms obtained by shifting the time window little by little are sequentially subjected to discrete Fourier transform and the results are accumulated in sequence, then only frequency components contained in a measured signal will be emphasized and the sidelobe frequency components will be weakened gradually. The present invention utilizes this principle.

The present invention is based on a signal processing system having an operation processing unit which takes data sets each consisting of a predetermined number of successive pieces of data from a continuously transferred data string and performs an operation on each of the data sets. This operation is a correlation operation using fast Fourier transform (FFT) by way of example.

A first mode of the present invention is arranged as follows.

A data entry section is provided which sequentially receives pieces of data in a data string in synchronism with the transfer rate of the data string.

Further, a data set extracting section is provided which, each time an operation unit completes readiness to perform an operation on a new data set, extracts from the data entry section a data set consisting of a predetermined number of successive pieces of data beginning at the position on the data string that is the number obtained by dividing that predetermined number by the ratio of the number of pieces of data which are operated on by the operation unit per unit time to the number of pieces of data which are entered into the data entry section per unit time behind the position of the first piece of data in the last data set fed into the operation unit prior to the completion of its readiness for operation. The data set thus extracted is then fed into the operation unit.

A second mode of the present invention which defines the first mode more specifically is shown in FIG. 3.

A shift register 101 receives pieces of data 104 in a data string sequentially in synchronism with the transfer rate of that data string and holds a data set 105 consisting of a predetermined number K of most recent pieces of data. The shift register 101 corresponds to the data entry section in the first mode described above. The transfer rate of the data string is determined by, for example, a transfer clock 108 which controls the transfer timing of the data string.

A buffer register 102 reads the data set 105 consisting of K pieces of data from the shift register 101 and holds it therein each time the operation unit completes readiness to perform an operation on a new data set. The shift register 101 is alerted to the completion of the readiness for operation by a operation ready signal 107 which is supplied from the operation unit thereto via a flip-flop (F/F) 110 operating in synchronism with the transfer clock 108.

An output data selector 103 outputs to the operation unit the data set 105 consisting of K pieces of data held by the buffer register 102 in synchronism with the operation speed of the operation unit. The operation speed of the operation unit depends on an operation/readout clock 109, which is also applied to the output data selector 103.

The buffer register 102 and the output data selector 103 correspond to the data set extracting section in the first mode of the present invention described above.

A third mode of the present invention will be described next.

A data entry section is provided which sequentially receives pieces of data in a data string in synchronism with the transfer rate of that data string.

A correction data acquisition section is provided which acquires correction data used to correct the timing of data string transfer. For example, this correction data is obtained from a data string transmission device and indicates a delay for data string transmission.

A data set extracting section is provided which, each time an operation unit completes readiness to perform an operation on a new data set, extracts from the data entry section a data set consisting of a predetermined number of successive pieces of data beginning at the position on the data string that is calculated from the position on the data string of the first piece of data in the last data set fed into the operation unit prior to the completion of its readiness for operation, the number obtained by dividing that predetermined number by the ratio of the number of pieces of data which are operated on by the operation unit per unit time to the number of pieces of data which are entered into the data entry section per unit time, and the correction data acquired by the correction data acquisition section. The data set thus extracted is then fed into the operation unit.

Figure 5:
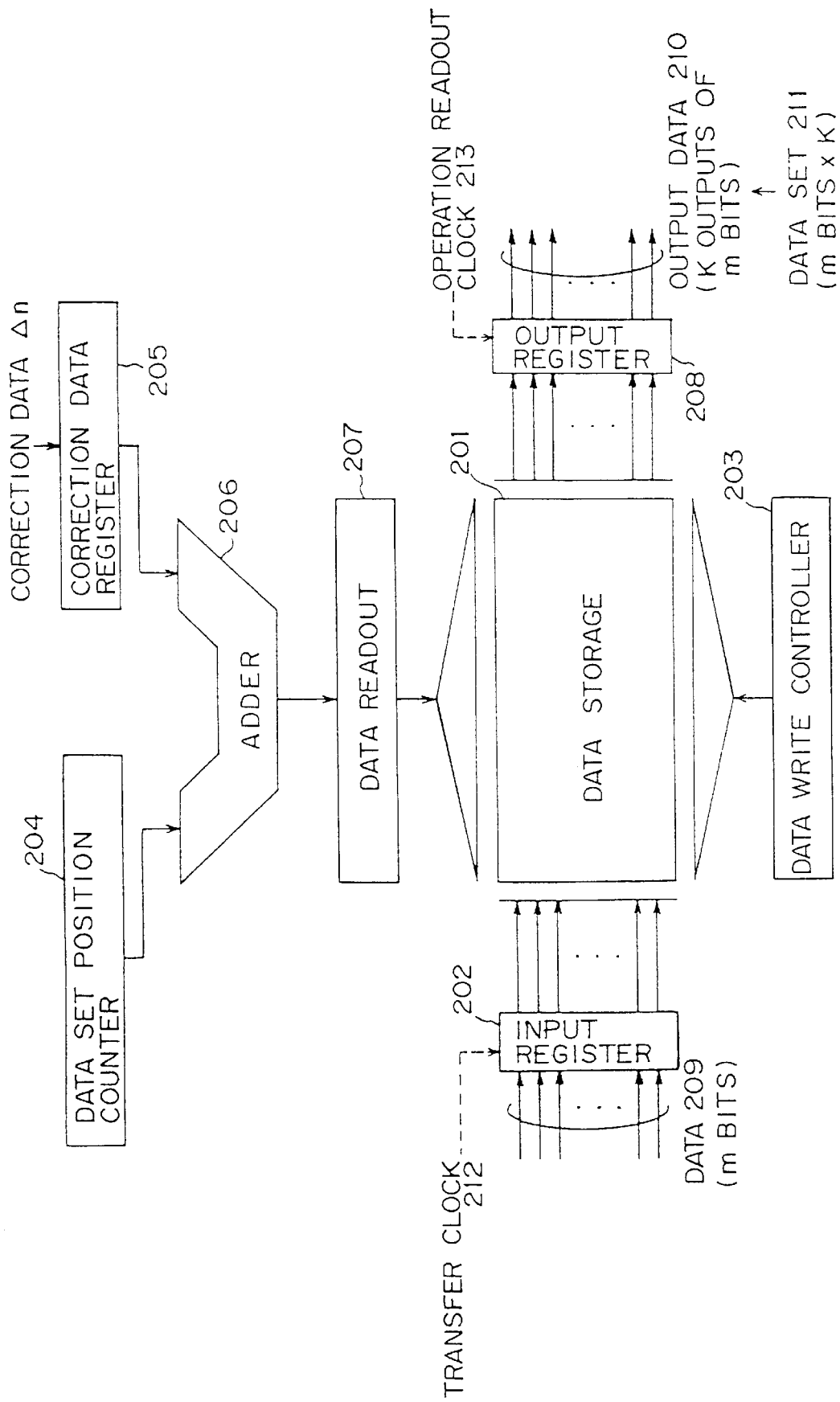
FIG. 5 is a second block diagram illustrating the principle of the invention.

A fourth mode of the present invention which defines the third mode more specifically is shown in FIG. 5.

Data storage 201 is a memory which stores successive pieces of data 209 in a data string.

An input register 202 takes the data 209 in the data string in synchronism with the transfer rate of the data string. The transfer rate is determined by a transfer clock 212.

A data write controller 203 writes the data 209 placed in the input register 202 into the data storage 201.

A data set position counter 204 is incremented by K/N whenever a data set 211 consisting of a predetermined number K of pieces of data 209 is read from the data storage 201 by a data readout controller 207 to be described later. Here, N is defined as the ratio of the number of pieces of data which are operated on by the operation unit per unit time to the number of pieces of data written by the data write controller 203 into the data storage 201 per unit time.

A correction data register 205 acquires correction data $\Delta_n$, used for correcting the timing of data string transfer, at regular intervals, e.g., at times separated by an interval during which time a predetermined number K of pieces of data is transferred and holds it therein.

An adder 206 adds the output of the data set position counter 204 and the output of the correction data register 205.

A data readout controller 207 causes a data set 211 consisting of K successive pieces of data 209 addressed by the adder 206 to be read from the data storage 201 each time the operation unit completes readiness to perform an operation on a new data set 211.

An output register 208 outputs the data set 211 from the data storage 201 to the operation unit to fit the operation speed of the operation unit. The operation speed of the operation unit depends on the rate of the operation/readout clock 213.

Figure 7:
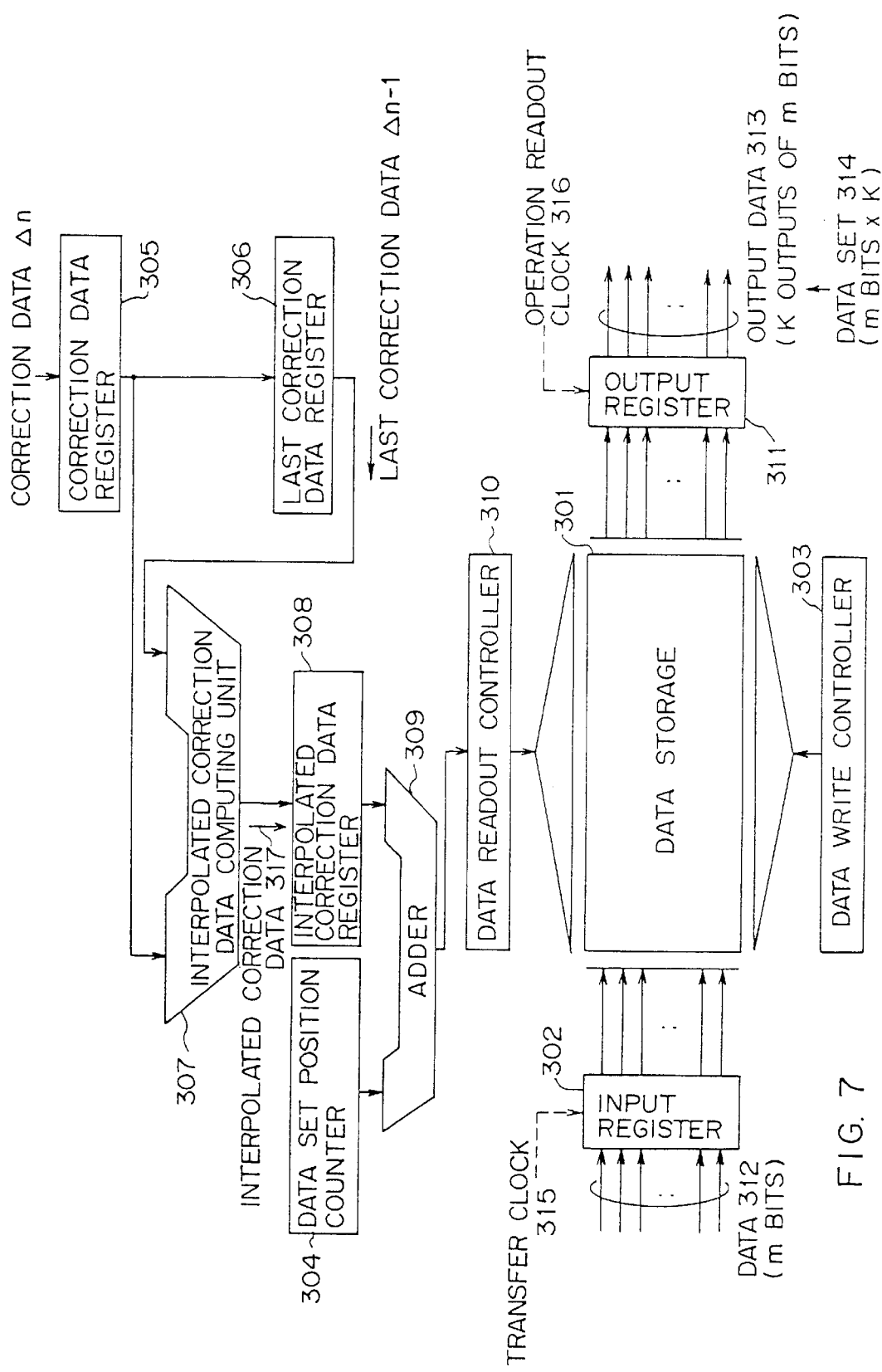
FIG. 7 is a third block diagram illustrating the principle of the invention.

A fifth mode of the present invention which is a still more specific version of the third mode is shown in FIG. 7.

Data storage 301 is a memory which stores successive pieces of data in a data string.

An input register 302 sequentially receives pieces of data 312 in the data string to fit its transfer rate. The transfer rate of the data string depends on the rate of a transfer clock 315.

A data write controller 303 writes the data 312 placed in the input register 302 into the data storage 301.

A data set position counter 304 is incremented by K/N each time a data set 314 consisting of a predetermined number K of pieces of data 312 is read out of the data storage 301. As with the fourth mode of the present invention described above, N is defined as the ratio of the number of pieces of data which is operated on by the operation unit per unit time to the number of pieces of data written into the data storage 301 by the data write controller 303 per unit time.

A correction data register 305 acquires correction data $\Delta_n$ for correcting the data string transfer timing at regular intervals and holds it therein. The interval is a time required to transfer K successive pieces of data in the data string.

A last correction data register 306 holds the correction data $\Delta_n$ which has been held in the correction data register 305 as the last correction data $\Delta_{n-1}$ each time new correction data $\Delta_n$ is loaded into the correction data register 305.

An interpolated correction data computing unit 307 computes interpolated correction data 317 interpolating $\Delta_n$ and $\Delta_{n-1}$ from the current correction data $\Delta_n$ held in the correction data register 305 and the last correction data $\Delta_{n-1}$ held in the last correction data register 306. If, as described above, the correction data $\Delta_n$ is acquired at each transfer of K pieces of data, then the interpolated correction data 317 will be computed as a value that varies in increments of $(\Delta_n - \Delta_{n-1})/N$ with the last correction data $\Delta_{n-1}$ taken as a starting value. Here, N is the above-described ratio.

An interpolated correction data register 308 holds the interpolated correction data 317 computed by the interpolated correction data computing unit 307.

An adder 309 adds the output of the data set position counter 304 and the output of the interpolated correction data register 308.

A data readout controller 310 permits the data set 314 consisting of K successive pieces of data addressed by the adder to be read from the data storage 301 whenever the operation unit completes readiness to perform an operation on a new data set 314.

An output register 311 outputs the data set 314 consisting of K pieces of data read from the data storage 301 to fit the operation speed of the operation unit. The operation speed is determined by the operation/readout clock 316.

Figure 4:
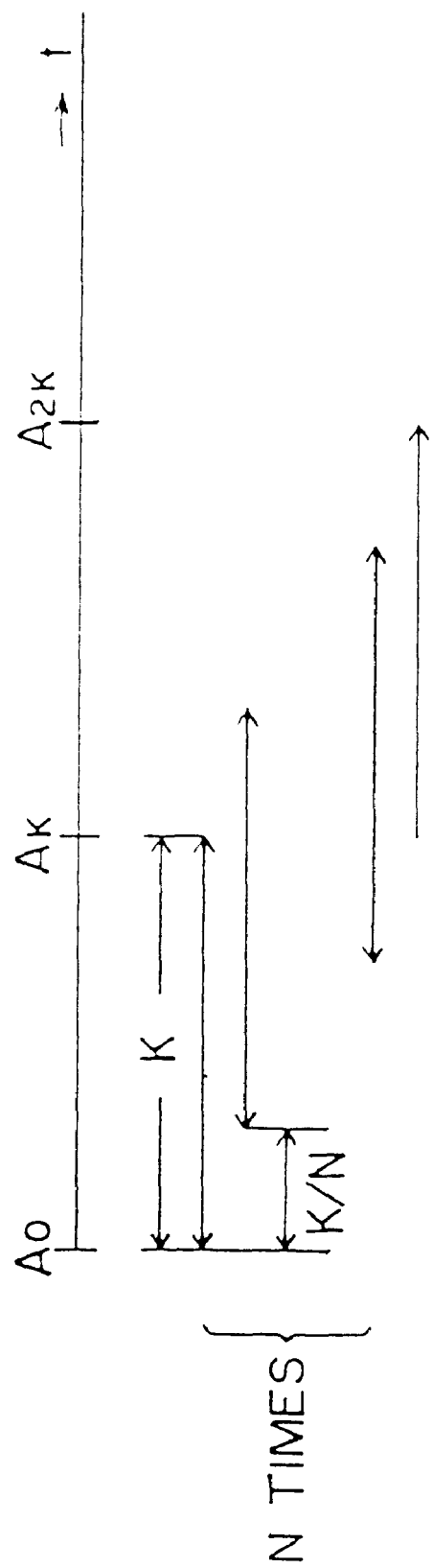
FIG. 4 is a diagram explanatory of the is operation of the principle of the invention shown in FIG. 3.

The first and second modes of the present invention operate as follows:

First, in the first mode, if, when the operation unit performs an operation such as FFT on each of data sets each consisting of a predetermined number of successive pieces of data (hereinafter referred to as K samples), the number of pieces of-data which are operated on by the operation unit per unit time is N times the number of pieces of data entered into the data entry section per unit time, then the operation unit will complete an operation on a data set consisting of K samples during the time K/N samples of data are entered into the data entry section as shown in FIG. 4.

Then, the data set extracting section extracts data sets of K samples in sequence from the data entry section with the extraction starting point on the data string shifted by K/N samples as shown in FIG. 4 each time the operation unit completes readiness to perform an operation on a new data set. Each data set thus extracted is then fed into the operation unit.

Such a function can be implemented by means of, in the second mode shown in FIG. 3, the shift register 101 into which the most recent data sets 105 each of K samples are entered in sequence in synchronism with the transfer clock 108, the buffer register 102 into which a data set of K samples is loaded from the shift register 101 in synchronism with the operation ready signal 107 supplied from the operation unit via the flip-flop 110 operating synchronously with the transfer clock 108, and the output data selector 103 from which the data set of K samples held in the buffer register 102 is output to the operation unit in synchronism with the operation/readout clock 109.

As described above, in the first and second modes of the present invention, data set extraction intervals overlap according to the ratio of the number of pieces of data which are operated on by the operation unit per unit time to the number of pieces of data entered per unit time. In comparison with the case where there is no data set extraction interval overlap, therefore, the precision in computational processing can be increased according to the ratio N without reducing computing efficiency of the operation unit.

The effects of the third mode of the present invention are as follows:

In this mode, each time the operation unit completes readiness to perform an operation on a new data set, the data set extraction intervals are made to overlap with each other according to the ratio of the number of pieces of data which are operated on by the operation unit per unit time to the number of pieces of data entered per unit time and the correction data acquired by the correction data acquiring section for correcting the data string transfer timing. As a result, in addition to the effects of the first or second mode, the third mode has the effect of absorbing data transmission delays in such a case where data transmitted from an aircraft is subjected to computational processing on the ground.

For the correction data for correcting the timing of data string transfer, the amount of correction can be calculated in real time from the position of an aircraft which is located by a radar all the time. Alternatively, correction data may be calculated beforehand from a predetermined route of the aircraft.

With a flying object such as an artificial satellite, correction data can be determined at the time a measurement is made because its orbit is already known.

The effects of the fourth mode shown in FIG. 5, which is a still more specific mode of the third mode, will be described below with reference to FIG. 6.

As with the first or second mode, if, when the operation unit performs FFT operations on data sets each of K successive samples, the number of pieces of data which are operated on by the operation unit per unit time is N times the number of pieces of data entered into the input register 202 per unit time, then the operation unit will have completed computational processing on a data set of K samples by the time K/N samples of data are entered into the input register 202.

The data set position counter 204 is incremented by K/N whenever a data set 211 of K samples is read from the data storage 201 via the output register 208 to the operation unit, thereby calculating the positions on the data string separated by K/N samples as in the case of FIG. 4.

Figure 6:
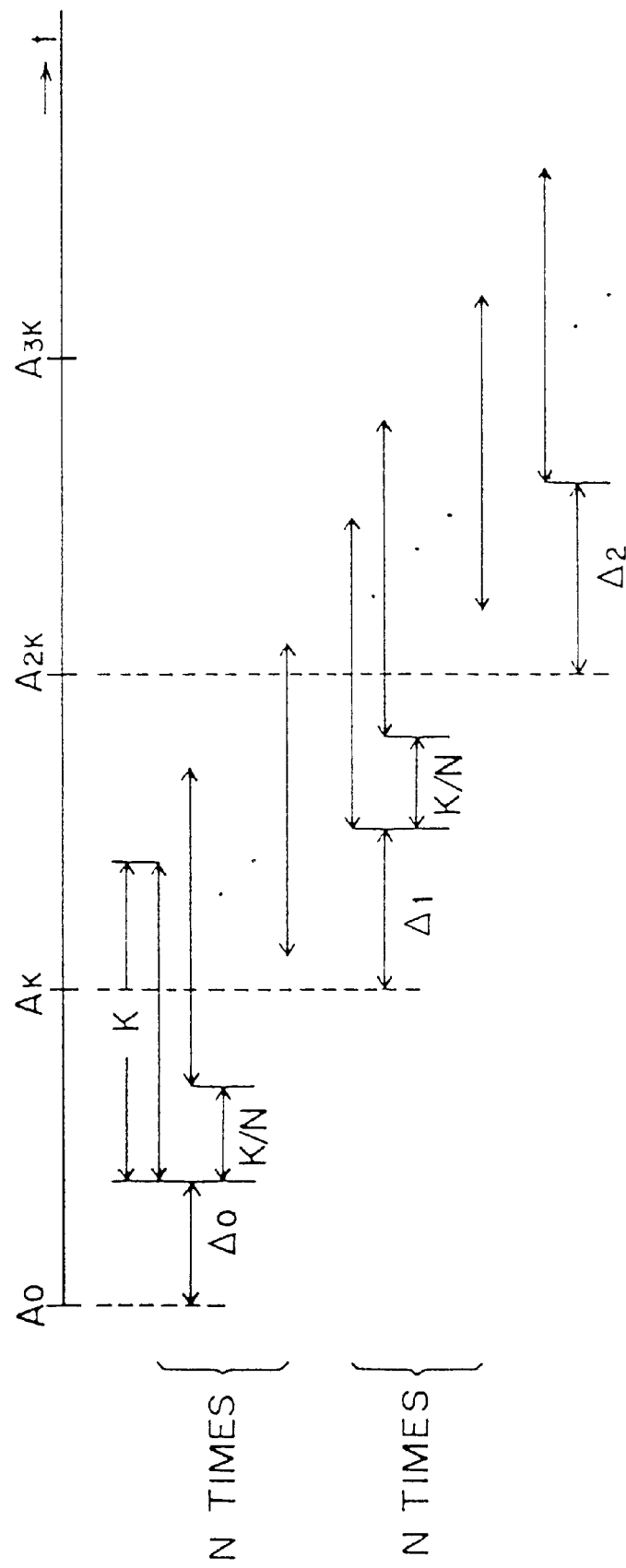
FIG. 6 is a diagram explanatory of the operation of the principle of the invention shown in FIG. 5.

On the other hand, as shown in FIG. 6, the correction data register 205 sequentially acquires from, for example, the data string transmitting device correction data $\Delta_0$, $\Delta_1$, $\Delta_2$ and so on at times $A_0$, $A_K$, $A_{2K}$ and so on which are separated by the interval during which time K successive pieces of data 209 are transferred and then entered into the input register.

The data readout controller 207 permits a data set 211 of K successive samples addressed by the adder 206, the output of which is the sum of the output of the data set position counter 204 and the output of the correction data register 205, to be read from the data storage 201 each time the operation unit completes readiness to perform an operation on a new data set. The extracting position of each data set 211 thus read is offset from the corresponding extracting position on the data string shown in FIG. 4 by correction data $\Delta_n$ (n=0, 1, 2, ,.) as shown in FIG. 6.

As a result, besides the effect of the first or second mode, the fourth mode of the present invention will have the effect of absorbing data transmission delays corresponding to the correction data $\Delta_n$ in such a case where computational processing is performed on data transmitted from an aircraft on the ground.

Next, the effect of the fifth mode of the present invention which is a still more specific version of the third mode described above will be described below with reference to FIG. 8.

In the fifth mode shown in FIG. 7, the data storage 301, the input register 302, the data write controller 303, the data set position counter 304, the adder 309, the data readout controller 310, and the output register 311 operate identically to their respective counterparts 201, 202, 204, 206, 207, and 208 in the fourth mode shown in FIG. 5.

The fifth mode is distinct from the fourth mode in that data to be added to the output of the data set position counter 304 in the adder 309 is not correction data $\Delta_n$ provided by the data string transmitting device at each transfer of a predetermined number K of pieces of data 312 but interpolated correction data 317 calculated by the interpolated correction data computing unit 307 and placed in the interpolated correction data register 308. This interpolated correction data 317 is represented by $(\Delta_n-\Delta_{n-1})/N$ which interpolates the current correction data $\Delta_n$ and the last correction data $\Delta_{n-1}$, which are successively input from the data string transmitting device at each transfer of K successive pieces of data in the data string.

Figure 8:
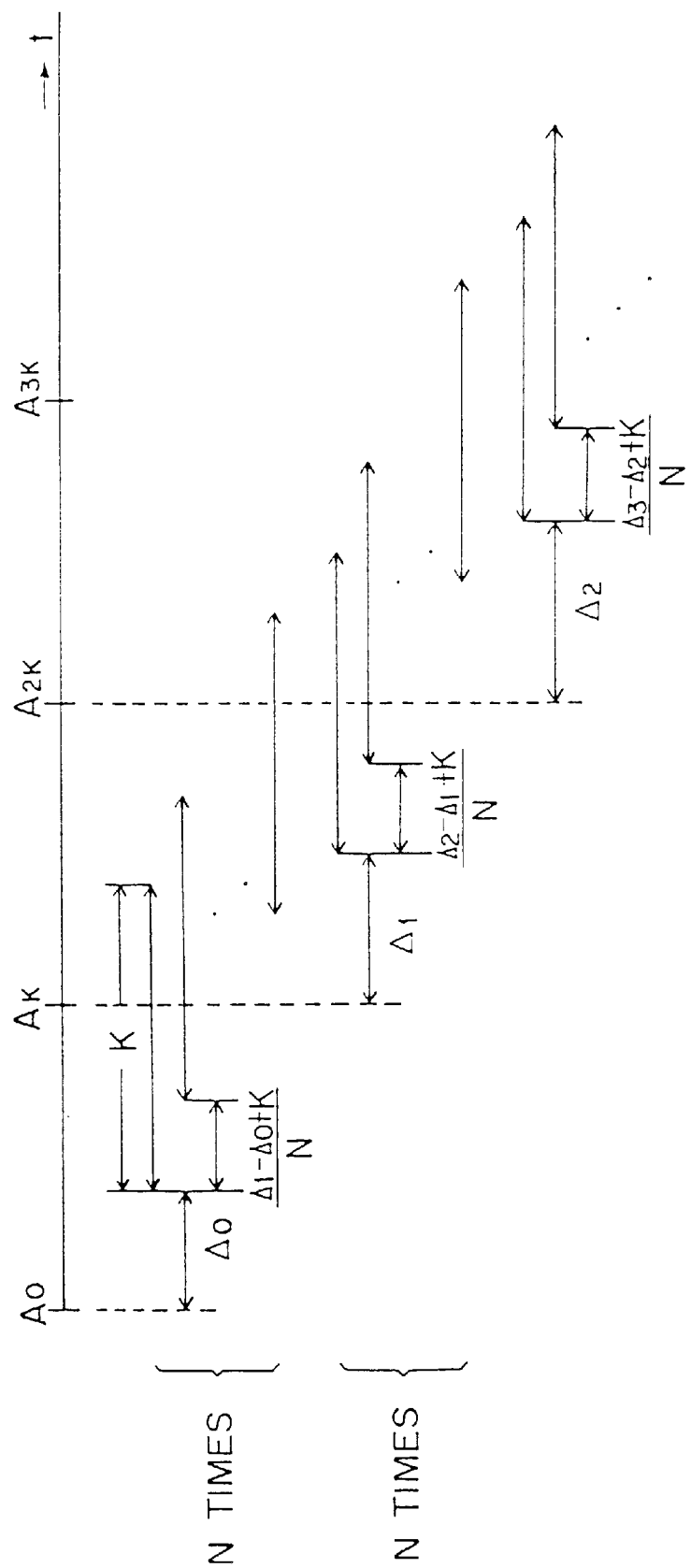
FIG. 8 is a diagram explanatory of the operation of the principle of the invention shown in FIG. 7.

As a result, unlike the fourth mode shown in FIG. 6, in the fifth mode, as shown in FIG. 8, the offset to be added to correction data for data set extracting position varies between data sets 314 read from the data storage 301 by the data readout controller 310. That is, data transmission delays are reflected in the extracting positions of data sets from the data storage 301 more accurately than in the fourth mode.

Hereinafter, the preferred embodiments of the present invention will be described in detail with reference to the accompanying drawings.

Figure 9:
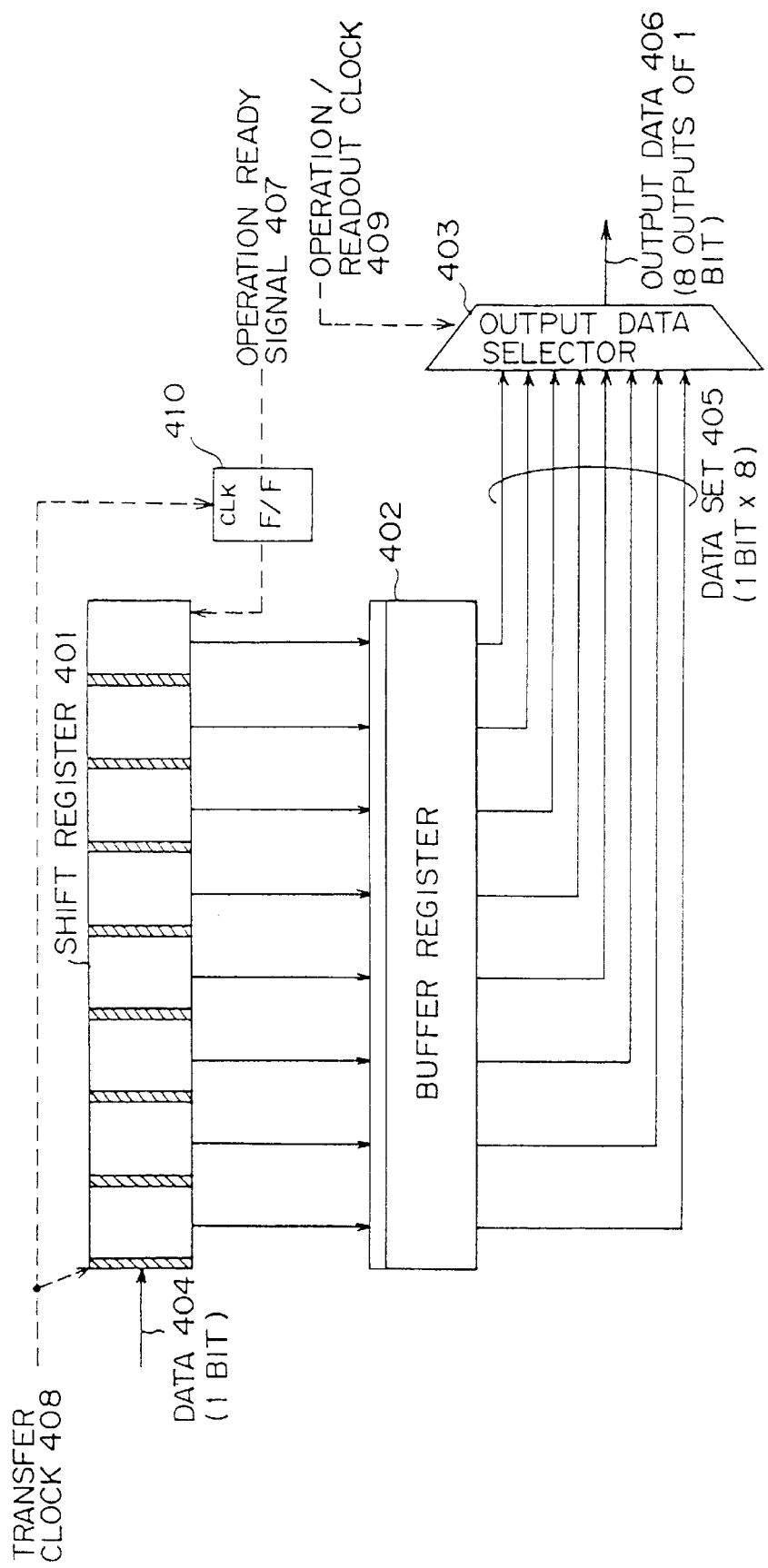
FIG. 9 illustrates a first embodiment of the present invention.

Referring now to FIG. 9, there is shown a first embodiment of the present invention.

A shift register 401 receives data 404 in a data string bit by bit in synchronism with a transfer clock 408 controlling the timing of data string transfer and holds a data set 405 consisting of most recent K=8 samples (bits) of data.

A buffer register 402 reads and holds the data set 405 consisting of K=8 samples of data 404 placed in the shift register 404 each time it receives from an operation unit not shown an operation ready signal 407, indicating that the operation unit completes readiness to perform an operation on a new data set, through a flip-flop (F/F) 410 operating in synchronism with the transfer clock 408.

An output data selector 403 outputs the data set 405 consisting of eight samples to the operation unit one sample (bit) at a time in synchronism with an operation/readout clock 409 supplied from the operation unit and synchronized with its operation rate.

The operation of the first embodiment will be described below with reference to FIGS. 10A to 10D which show timing diagrams.

As described above in connection with the description of FIG. 4 for the first and second modes of the present invention, it is supposed that the number of pieces of data which are operated on by the operation unit per unit time is N times the number of pieces of data entered into the shift register 401 per unit time when the operation unit performs an operation, such as FFT, on each of data sets 405 each of eight successive samples of data.

In this case, each time the operation unit completes readiness to perform an operation on a new data set, data sets whose extraction starting positions on the data string are shifted by K/N=8/N as shown in FIG. 4 are fed in sequence from the buffer register 402 into the operation unit via the output data selector 403.

Figures 10A, 10B, 10C, 10D:
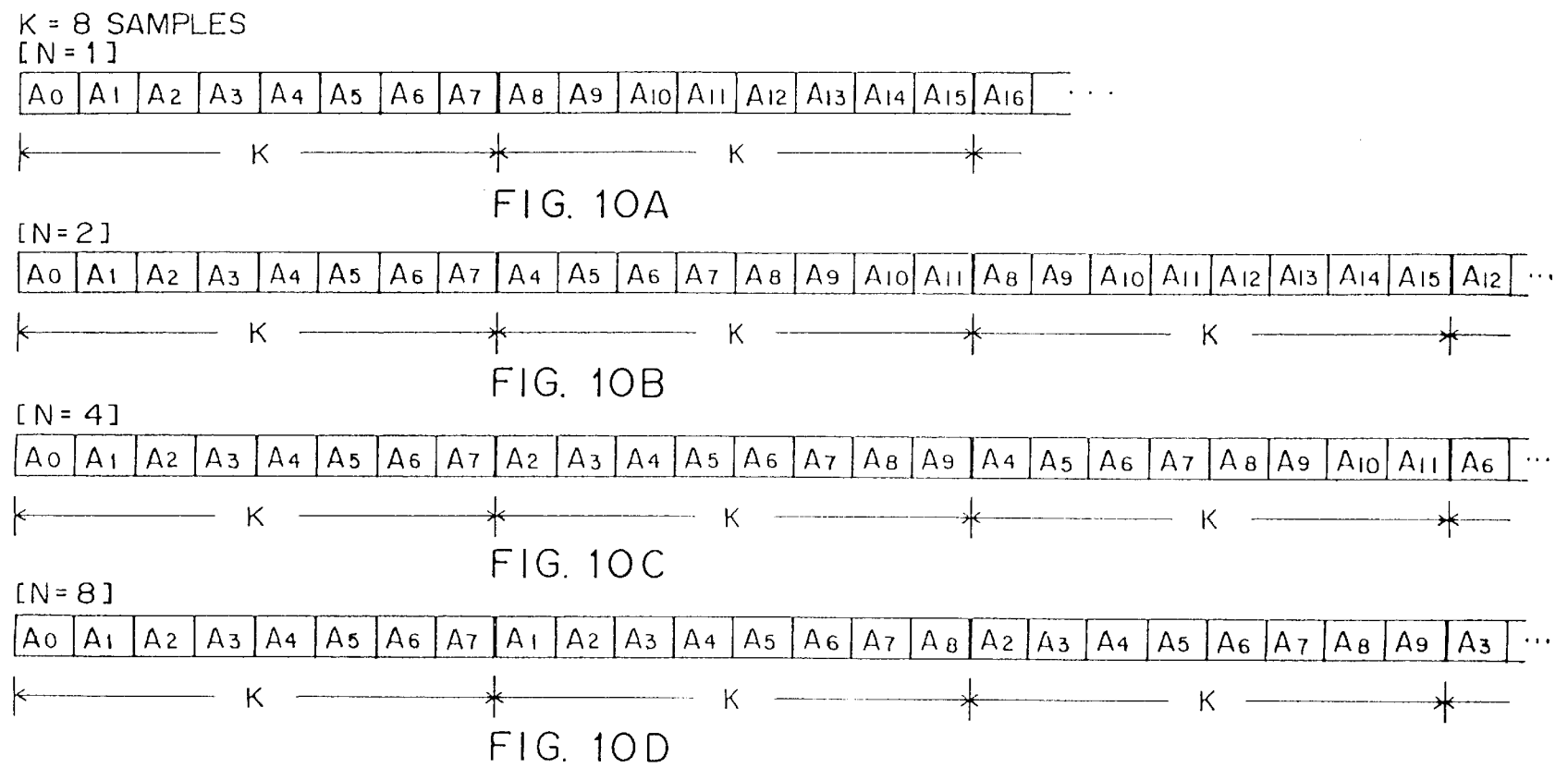

When N=1, that is, when the operation rate of the operation unit is equal to the transfer rate of data 404, a data set 405 consisting of K=8 samples of data 404 (addresses $A_0$ to $A_7$) is first sent to the operation unit as output data 406 as shown in FIG. 10A. At the time of the next operation, a data set 405 consisting of eight samples of data (addresses $A_8$ to $A_{15}$) following the first eight samples of data is sent to the operation unit as output data 406.

When N=2, that is, when the operation rate of the operation unit is twice the transfer rate of data 404, a data set 405 consisting of eight samples of data 404 (addresses $A_0$ to $A_7$) is first sent to the operation unit as output data 406 as shown in FIG. 10B. At the time of the next operation, a data set 405 consisting of eight samples (addresses $A_4$ to $A_{11}$) comprising four samples in the latter half of the first 8-sample data set and four fresh samples following the first data set is sent to the operation unit as output data 406.

Moreover, when N=4, that is, when the operation rate of the operation unit is four times the transfer rate of data 404, a data set 405 consisting of eight samples of data (addresses $A_0$ to $A_7$) is first sent to the operation unit as output data 406 as shown in FIG. 10C. At the time of the next operation, a data set 405 consisting of eight samples of data 404 (addresses $A_2$ to $A_9$) comprising the third to eighth samples ($A_2$ to $A_7$) in the first 8-sample data set and two fresh samples following the first 8-sample data set is sent to the operation unit as output data 406.

Furthermore, when N=8, that is, when the operation rate of the operation unit is eight times the transfer rate of data 404, a data set 405 consisting of eight samples of data (addresses=$A_0$ to $A_7$) is first sent to the operation unit as output data 406 as shown in FIG 10D. At the time of the next operation, a data set 405 consisting of eight samples of data 404 (addresses=$A_1$ to $A_8$) comprising the second to eighth samples ($A_1$ to $A_7$) in the first 8-sample data set and one fresh sample ($A_8$) following the first 8-sample data set is sent to the operation unit as output data 406.

As described above, according to the first embodiment, the data set extraction intervals overlap according to the ratio N of the number of pieces of data which are operated on by the operation unit per unit time to the number of pieces of input data per unit time. In comparison with the case where the data set extraction intervals do not overlap, the precision of computational processing can be increased according to the ratio N without reducing operating efficiency of the operation unit.

Advantages of increased precision of computational processing will be described for the case where the operation unit performs frequency analysis processing based on discrete Fourier transform using the technique of FFT.

With discrete Fourier transform using the technique of FFT, if the time length of a data set extraction interval is equal to integral multiples of the period of frequency components contained in a measured signal, then those frequency components will be extracted accurately.

In general, however, the period of frequency components contained in a measured signal can take values other than integral submultiples of the data extraction interval. If discrete Fourier transform were carried out on such a signal, then unwanted frequency components called sidelobes would be extracted in addition to frequency components contained in the signal.

To suppress such unwanted frequency components as much as possible, a mathematical technique is usually used which multiplies an extracted signal by a window function, such as a Hunning window, Hamming window, or the like, and performs discrete Fourier transform on the result. However, such a technique requires an extra arithmetic operation of multiplication by a window function. In addition, the resulting frequency component will have a constant width centered at a frequency component contained in the measured signal, thus resulting in reduced analysis precision.

Thus, as in the first embodiment, data extraction intervals are made to overlap with each other, FFT is carried out on data sets 405 thus extracted, and then the results are accumulated for each frequency component. As a result of such processing, since extracted side lobes will vary slightly among the data sets 405, the side lobes will be suppressed when accumulated. On the other hand, although signal components inherent in a measured signal also vary slightly among data sets 405, the variation is very gentle. For this reason, the signal components inherent in a measured signal will be emphasized in the result of computational processing, providing improvements in the signal-to-noise ratio.

Although, in the first embodiment, the timing of transfer of a data set from the shift register 401 to the buffer register 402 is determined by the operation ready signal 407 supplied from the operation unit, it may be determined, for example, by a counter adapted to detect that the transfer clock 408 has been applied to the shift register K/N times.

Next, a second embodiment of the present invention will be described with reference to FIG. 11.

Data storage 501 is a memory which stores a plurality of successive pieces of 1-bit data 509 in a data string.

An input register 502 takes each piece of 1-bit data 509 in the data string in sequence in synchronism with a transfer clock 512 controlling the timing of data string transfer.

A data write counter 503 writes data 509 placed in the input register 502 into the data storage 501.

A data set position counter 504 is incremented by K/N= 6/N each time a data set 511 consisting of, for example, K=6 samples of data 509 is read from the data storage 501 as a result of being addressed by a data readout counter 507 to be described later. As in the first embodiment, N is defined as the ratio of the number of pieces of data which are operated on by the operation unit per unit time to the number of pieces of data 509 entered into the input register per unit time.

A correction data register 505 acquires and holds data transfer timing correction data $\Delta_n$(n=0, 1, 2, . . . ) at each transfer of six samples of data in the data string.

An adder 506 adds the output of the data set position counter 504 and the output of the correction data register 505.

The data readout counter 507 sequentially outputs to the data storage 501 addresses for K=6 successive samples starting with an address corresponding to an output value of the adder 506 each time the operation unit completes readiness to perform an operation on a new data set 511. Consequently, a data set 511 consisting of six samples is read out of the data storage 501.

An output register 508 outputs to the operation unit a data set 511 consisting of K=6 samples of data, which are sequentially addressed by the data readout counter 507 and read from the data storage 501, one sample (bit) at a time, in synchronism with an operation/readout clock 513 which is supplied from the operation unit and synchronized with its operation rate.

The operation of the second embodiment will be described with reference to FIGS. 12A to 12D.

The data set position counter 504 is incremented by K/N=6/N each time a data set of six samples is read from the data storage 501 via the output register 508 into the operation unit and thereby calculates positions on the data string which are separated by 6/N samples.

On the other hand, as previously described in connection with the description of FIG. 6 for the fourth mode of the present invention, the correction data register 505 sequentially acquires and holds correction data $\Delta_0$, $\Delta_1$, $\Delta_2$, and so on shown in FIG. 6 from a data transmitting device at times $A_0, A_K, A_{2K}$ and so on separated by an interval during which time six successive samples of data 509 in a data string are entered into the input register 502.

The data readout counter 507 specifies to the data storage 501 addresses for six successive samples in a data set 511 starting with an address corresponding to the output of the adder 506 which is the sum of the output of the data set position counter 504 and the output of the correction data register 505 each time the operation unit completes readiness to perform an operation on a new data set. The extraction position of each of data sets 511 thus read from the data storage 501 is displaced from the corresponding extraction starting position on a data string shown in FIG. 4 by the offset corresponding to correction data $\Delta_n$ (n=0, 1, 2, . . . ) as shown in FIG. 6.

Figure 12A:
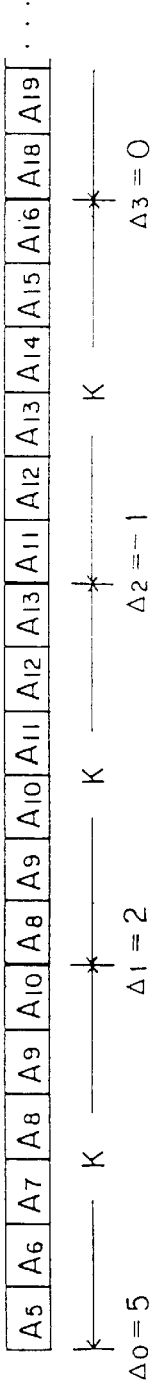
FIGS. 12A to 12D are a diagram for use in explanation of the operation of the second embodiment of FIG. 11.

Here, when N=1, that is, when the operation rate of the operation unit is equal to the transfer rate of data 509, a data set 511 consisting of K=6 successive samples of data (addresses $A_5$ to $A_{10}$) beginning at the extracting position on the data string corresponding to $\Delta_0$=5 is first sent to the operation unit as shown in FIG. 12A. At the time of the next operation, a data set consisting of six successive samples of data 509 (addresses $A_8$ to $A_{13}$) beginning at the extraction position $\Delta_1$+K=2+6=8 is sent to the operation unit as output data 510.

Figure 12B:
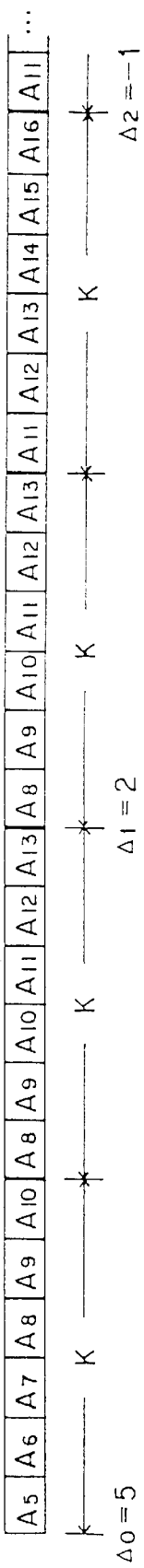

When N=2, that is, when the operation rate of the operation unit is twice the transfer rate of data 509, a data set 511 consisting of K=6 successive samples of data (addresses $A_5$ to $A_{10}$) beginning at the extracting position on the data string corresponding to $\Delta_0$=5 is first sent to the operation unit as shown in FIG. 12B. At the time of the next operation, a data set consisting of six successive samples of data 509 (addresses $A_8$ to $A_{13}$) beginning at the extraction position $\Delta_0$+K/N=5+6/2=8 is sent to the operation unit as output data 510. At the time of the next operation, a data set consisting of six successive samples of data 509 (addresses $A_8$ to $A_{13}$) beginning at the extraction position $\Delta_1$+K=2+6=8 is sent to the operation unit as output data 510.

Figure 12C:
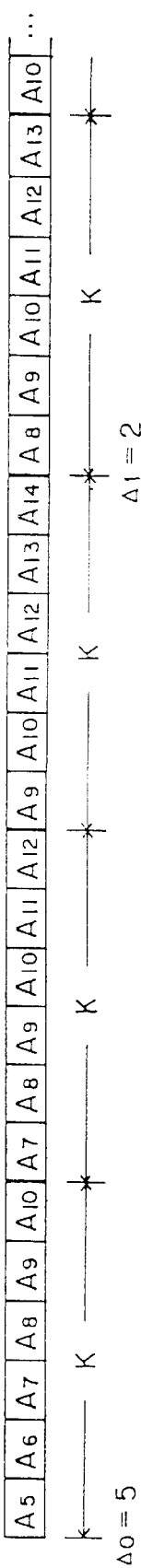

When N=3, that is, when the operation rate of the operation unit is triple the transfer rate of data 509, a data set 511 consisting of K=6 successive samples of data (addresses $A_5$ to $A_{10}$) beginning at the extracting position on the data string corresponding to $\Delta_0$=5 is first sent to the operation unit as shown in FIG. 12C. At the time of the next operation, a data set consisting of six successive samples of data 509 (addresses $A_7$ to $A_{12}$) beginning at the extraction position $\Delta_0$+K/N=5+6/3=7 is sent to the operation unit as output data 510. At the time of the next operation, a data set consisting of six successive samples of data 509 (addresses $A_9$ to $A_{14}$) beginning at the extraction position $\Delta_0$+K/N+K/N=5+6/3+6/3=9 is sent to the operation unit as output data 510. At the time of the next operation, a data set consisting of six successive samples of data 509 (addresses $A_8$ to $A_{13}$) beginning at the extraction position $\Delta_1$+K=2+6=8 is sent to the operation unit as output data 510.

Figure 12D:
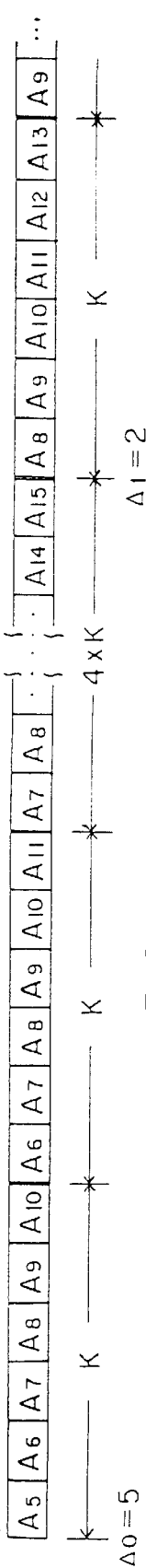

The case where N=6 shown in FIG. 12D may be considered in like manner.

Thus, according to the second embodiment, in addition to the advantages of the first embodiment, data transmission delays corresponding to correction data $\Delta_n$ can be absorbed in the case where computational processing is carried out on data transmitted from an aircraft on the ground.

Reference will now be made to FIG. 13 to describe a third embodiment of the present invention.

Figure 11:
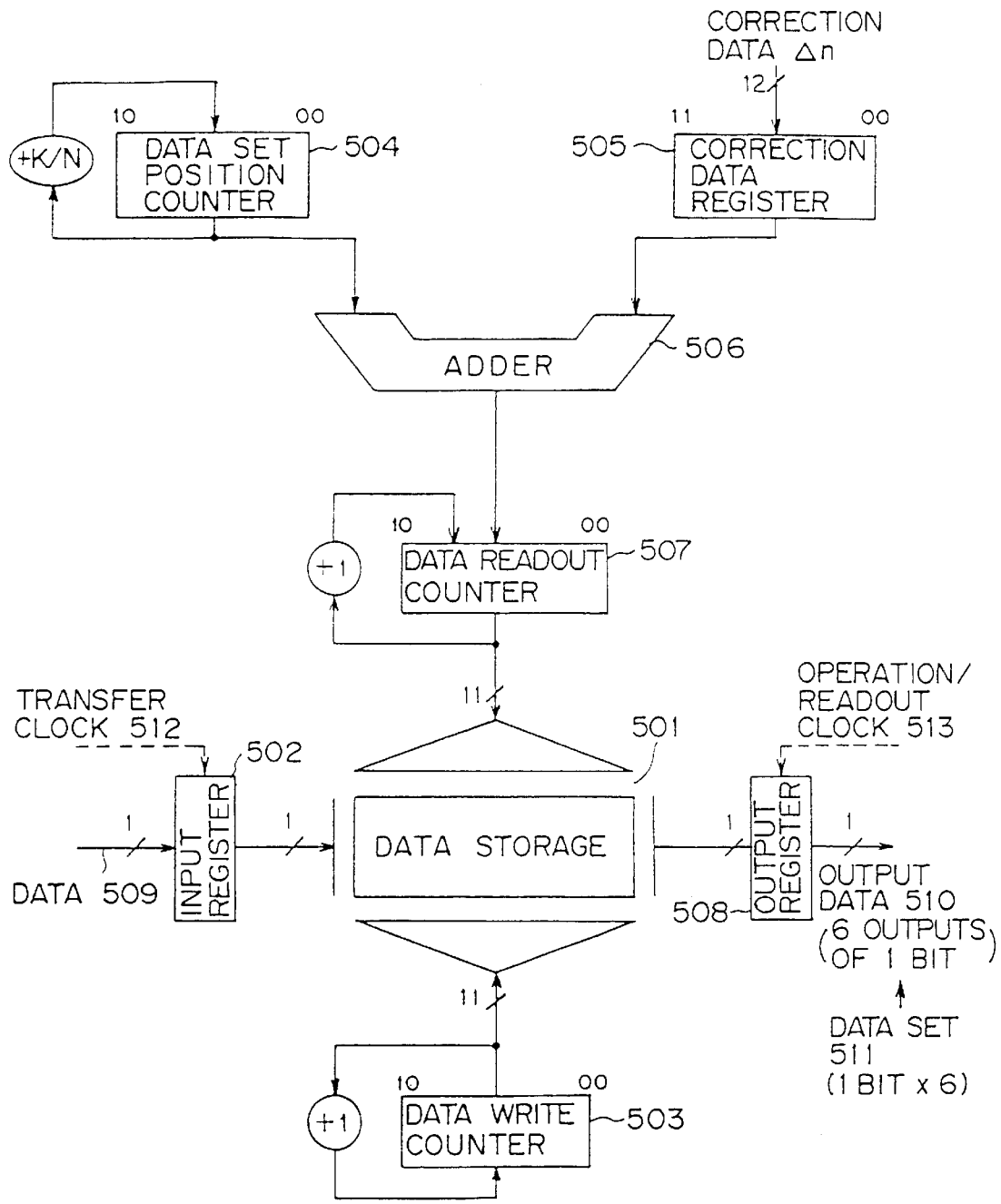
FIG. 11 illustrates a second embodiment of the present invention.

In the third embodiment, data storage 601, input register 602, data write counter 603, data set position counter 604, adder 609, data readout counter 610, and output register 611 operate identically to their respective counterparts 501, 502, 503, 504, 506, 507, and 508 in the second embodiment shown in FIG. 11.

The third embodiment is distinct from the second embodiment in that data to be added to the output of the data set position counter 604 in the adder 609 is not correction data $\Delta_n$ itself provided by the data string transmitting device at each transfer of a predetermined number K of pieces of data 612 but interpolated correction data 617 calculated by an interpolated correction data calculation unit 607 and placed in an interpolated correction data register 608. This interpolated correction data 617 is represented by $(\Delta_n-\Delta_{n-1})/N$ which interpolates the current correction data $\Delta_n$ and the last correction data $\Delta_{n-1}$, which are successively input from the data string transmitting device at each transfer of K successive pieces of data in the data string.

As a result, unlike the fourth mode shown in FIG. 6, as previously described in connection with the description of FIG. 8 for the fifth and sixth modes of the present invention, the offset, $(\Delta_n-\Delta_{n-1})/N$, dependent on correction data entered at each transfer of K=4 samples of data 612 in a data string is added to the extracting position of each of data sets 614 read from the data storage 601 by the data readout counter 610. That is, data transmission delays will be reflected in the extracting positions of data sets 614 from the data storage 60 more accurately.

Referring now to the timing diagrams shown in FIGS. 14A to 14C, the operation of the third embodiment will be described more specifically.

First, when N=1, that is, when the operation rate of the operation unit is equal to the transfer rate of data 612, a data set 614 consisting of K=4 successive samples of data 612 (addresses $A_2$ to $A_5$) beginning at the extracting position on the data string corresponding to $\Delta_0$=2 is first sent to the operation unit as output data 613 as shown in FIG. 14A. At the time of the next operation, a data set consisting of four successive samples of data 612 (addresses $A_8$ to $A_{11}$) beginning at the extraction position $\Delta_1$+K=4+4=8 is sent to the operation unit as output data 613.

Next, when N=2, that is, when the operation rate of the operation unit is twice the transfer rate of data 612, a data set 614 consisting of K=4 successive samples of data 612 (addresses $A_2$ to $A_5$) beginning at the extracting position on the data string corresponding to $\Delta_0$=2 is first sent to the operation unit as output data 613 as shown in FIG. 14B. At the time of the next operation, a data set consisting of four successive samples of data 612 (addresses $A_5$ to $A_8$) beginning at the extraction position $\Delta_0$+$(\Delta_1-\Delta_0)$/N+K/N=2+(4−2)/2+4/2=5 is sent to the operation unit as output data 614. At the time of the next operation, a data set 614 consisting of four successive samples of data 612 (addresses $A_8$ to $A_{11}$) beginning at the extraction position $\Delta_1$+K=4+4=8 is sent to the operation unit as output data 613.

Finally, when N=4, when the operation rate of the operation unit is quadruple the transfer rate of data 612, a data set 614 consisting of K=4 successive samples of data 612 (addresses $A_2$ to $A_5$) beginning at the extracting position on the data string corresponding to $\Delta_0$=2 is first sent to the operation unit as output data 613 as shown in FIG. 14C. At the time of the next operation, a data set 614 consisting of four successive samples of data 612 (addresses $A_6$ to $A_9$) beginning at the extraction position $\Delta_0$+$(\Delta_1-\Delta_0)$/N+K/N=2+(14−2)/4+4/4=6 is sent to the operation unit as output data 613. At the time of the next operation, a data set 614 consisting of four successive samples of data 612 (addresses $A_{10}$ to $A_{13}$) beginning at the extraction position $\Delta_0$+{$(\Delta_1-\Delta_0)$/N}×2+(K/N)×2=2+{(14−2)/4}×2+(4/4)×2=10 is sent to the operation unit as output data 613. At the time of the next operation, a data set 614 consisting of four successive samples of data 612 (addresses $A_{14}$ to $A_{17}$) beginning at the extraction position $\Delta_0$+{$(\Delta_1-\Delta_0)$/N}×3+(K/N)×3=2 +{(14−2)/4}×3+(4/4) ×3=14 is sent to the operation unit as output data 613. At the time of the next operation, a data set 614 consisting of four successive samples of data 612 (addresses $A_{18}$ to $A_{21}$) beginning at the extraction position $\Delta_1$+K=14+4=18 is sent to the operation unit as output data 613.

In the third embodiment, even when the correction data $\Delta_n$ is supplied at intervals of a relatively long time, a correction in each data set extraction position on a data string can be predicted by assuming that a linear variation exists between contiguous correction data. This permits data transmission delays to be reflected in data extraction positions of data sets 614 more accurately than in the second embodiment.

According to the first and second modes of the present invention, data extraction intervals are made to overlap with each other according to the ratio of the number of pieces of data which are operated on by the operation unit per unit time and the number of pieces of data which are entered into the data input section per unit time, thus improving the precision of the operation processing according to the ratio N without reducing the operation efficiency of the operation unit in comparison with the case where there is no data extraction interval overlap.

According to the third through sixth modes of the present invention, the data extraction intervals are made to overlap with each other according to the ratio of the number of pieces of data which are operated on by the operation unit per unit time and the number of pieces of input data per unit time and the correction data for correcting the timing of data string transfer each time the operation unit completes readiness to perform an operation on a fresh data set As a result, besides the advantages of the first or second mode, data transmission delays can be absorbed in the case where operation processing is performed on data transmitted from an aircraft on the ground.

In particular, according to the fifth and sixth modes of the present invention, the offset corresponding to correction data supplied at regular intervals is added to the extracting position of each of data sets read from the data storage by the data readout controller, thus permitting data transmission delays to be reflected in the data set extracting positions more accurately.

What is claimed is:

1. A variable-rate data entry control device for taking data sets each consisting of a predetermined number of successive pieces of data in sequence from a data string that is transferred continuously, and sending said data sets to an operation unit which performs an operation on each of said data sets, comprising:

data entry means for receiving pieces of data in said data string in sequence, in synchronism with the transfer rate of said data string; and data set extracting means for extracting a new data set which is to be operated on by said operation unit from said data entry means in such a way that it overlaps with the last data set which was operated on by said operation unit by shifting a time window on the same data string, said new data set being subsequently sent to said operation unit.

2. A variable-rate data entry control device for taking data sets each consisting of a predetermined number of successive pieces of data in sequence from a data string that is transferred continuously, and sending said data sets to an operation unit which performs an operation on each of said data sets, comprising:

data entry means for receiving pieces of data in said data string in sequence, in synchronism with the transfer rate of said data string; and data set extracting means for, each time said operation unit completes readiness to perform an operation on a new data set, extracting from said data entry means using a shifting time window on the same data string a data set consisting of said predetermined number of successive pieces of data beginning at the position on said data string that is the number obtained by dividing said predetermined number by the ratio of the number of pieces of data which are operated on by said operation unit per unit time to the number of pieces of data which are entered into said data entry means per unit time behind the position on said data string of the first piece of data in the last data set fed into said operation unit, prior to the completion of its readiness for operation.

3. A variable-rate data entry control device for taking data sets each consisting of a predetermined number of successive pieces of data in sequence from a data string that is transferred continuously, and sending said data sets to an operation unit which performs an operation on each of said data sets, comprising:

shift register means for receiving pieces of data in said data string in sequence, in synchronism with the transfer rate of said data string, and holding the most recent data set consisting of said predetermined number of pieces of data;

buffer register means for, each time said operation unit completes readiness to perform an operation on a new data set, reading said most recent data set of a shifted time window on the same data string and consisting of said predetermined number of pieces of data from said shift register means and holding it therein; and output means for outputting said most recent data set held in said buffer register means to said operation unit.

4. The device according to claim 3, wherein said output means outputs said most recent data set consisting of said predetermined number of pieces of data held in said buffer register means to said operation unit in synchronism with the operation rate of said operation unit.

5. A variable-rate data entry control device for taking data sets each consisting of a predetermined number of successive pieces of data in sequence from a data string that is transferred continuously, and sending said data sets to an operation unit which performs an operation on each of said data sets, comprising:

data entry means for receiving pieces of data in said data string in sequence, in synchronism with the transfer rate of said data string;

transfer timing correction data acquisition means for acquiring transfer timing correction data for correcting the transfer timing of said data string; and data set extracting means for, each time said operation unit completes readiness to perform an operation on a new data set, extracting from said data entry means a data set of a shifted time window on the same data string and consisting of said predetermined number of successive pieces of data, beginning at the position on said data string that is calculated from the position on said data string of the first piece of data in the last data set fed into said operation unit prior to the completion of its readiness for operation, the number obtained by dividing said predetermined number by the ratio of the number of pieces of data which are operated on by said operation unit per unit time to the number of pieces of data which are entered into said data entry means per unit item, and said correction data acquired by said correction data acquisition means.

6. A variable-rate data entry control device for taking data sets each consisting of a predetermined number of successive pieces of data in sequence from a data string that is transferred continuously, and sending said data sets to an operation unit which performs an operation on each of said data sets, comprising:

data storage means for storing a plurality of successive pieces of data in said data string;

input register means for receiving pieces of data in said data string in sequence, in synchronism with the transfer rate of said data string;

data write control means for writing said data entered into said input register means into said data storage means;

data set position counter means which is incremented by the number obtained by dividing said predetermined number by the ratio of the number of pieces of data which are operated on by said operation unit per unit time to the number of pieces of data which are written into said data storage means by said data write control means per unit time each time a data set consisting of said predetermined number of pieces of data is read from said data storage means;

transfer timing correction data register means for acquiring transfer timing correction data for correcting the transfer timing of said data string at regular intervals and holding it therein;

adder means for adding a count value of said data set position counter means and said transfer correction data of said transfer timing correction data register means;

data readout control means for reading from said data storage means a data set of a shifted time window on the same data string and consisting of said predetermined number of successive pieces of data addressed by said adder means each time said operation unit completes readiness to perform an operation on a new data set; and output register means for outputting said data set consisting of said predetermined number of pieces of data read from said data storage means by said data readout control means to said operation unit.

7. The device according to claim 6, wherein said output register means outputs said data set consisting of said predetermined number of pieces of data read from said data storage means to said operation unit in synchronism with the operation rate of said operation unit.

8. A variable-rate data entry control device for taking data sets each consisting of a predetermined number of successive pieces of data in sequence from a data string that is transferred continuously, and sending said data sets to an operation unit which performs an operation on each of said data sets, comprising:

data storage means for storing a plurality of successive pieces of data in said data string;

input register means for receiving pieces of data in said data string in sequence, in synchronism with the transfer rate of said data string;

data write control means for writing said data entered into said input register means into said data storage means;

data set position counter means which is incremented by the number obtained by dividing said predetermined number by the ratio of the number of pieces of data which are operated on by said operation unit per unit time to the number of pieces of data which are written into said data storage means by said data write control means per unit time, each time a data set consisting of said predetermined number of pieces of data is read from said data storage means;

transfer timing correction data register means for acquiring transfer timing correction data for correcting the transfer timing of said data string at regular intervals and holding it therein;

last transfer timing correction data register means for, each time said transfer timing correction data register means holds new transfer timing correction data, holding the previous transfer timing correction data which had been held in said transfer timing correction data register means as the last transfer timing correction data;

interpolated correction data calculating means for calculating interpolated correction data which interpolates the correction data being held in said correction data register means and the last correction data being held in said last correction data register means from the two pieces of correction data;

interpolated correction data register means for holding said interpolated correction data calculated by said interpolated correction data calculating means;

adder means for adding a count value of said data set position counter means and said interpolated correction data of said interpolated correction data register means;

data readout control means for reading from said data storage means a data set of a shifted time window on the same data string and consisting of said predetermined number of successive pieces of data addressed by said adder means each time said operation unit completes readiness to perform an operation on a new data set; and output register means for outputting said data set consisting of said predetermined number of pieces of data read from said data storage means by said data readout control means to said operation unit.

9. A variable-rate data entry control device for taking data sets each consisting of a predetermined number of successive pieces of data in sequence from a data string that is transferred continuously and sending said data sets to an operation unit which performs an operation on each of said data sets, comprising:

data storage means for storing a plurality of successive pieces of data in said data string;

input register means for receiving pieces of data in said data string in sequence, in synchronism with the transfer rate of said data string;

data write control means for writing said data entered into said input register means into said data storage means;

data set position counter means which is incremented by the number obtained by dividing said predetermined number by the ratio of the number of pieces of data which are operated on by said operation unit per unit time to the number of pieces of data which are written into said data storage means by said data write control means per unit time, each time a data set consisting of said predetermined number of pieces of data is read from said data storage means;

transfer timing correction data register means for acquiring transfer timing correction data for correcting the transfer timing of said data string at times separated by an interval during which time said predetermined number of pieces of data in said data string is transferred, and holding it therein;

last transfer timing correction data register means for, each time said transfer timing correction data register means holds new transfer timing correction data, holding transfer timing correction data which had been held in said correction data register means as the last transfer timing correction data;

interpolated correction data calculating means for calculating interpolated correction data which interpolates correction data being held in said correction transfer timing data register means and the last transfer timing correction data being held in said last transfer timing correction data register means, by incrementing said last transfer timing correction data by a value obtained by dividing a difference between said transfer timing correction data and said last transfer timing correction data by said ratio;

interpolated correction data register means for holding said interpolated correction data calculated by said interpolated correction data calculating means;

adder means for adding a count value of said data set position counter means and said interpolated correction data of said interpolated correction data register means;

data readout control means for reading from said data storage means a data set of a shifted time window on the same data string consisting of said predetermined number of successive pieces of data addressed by said adder means each time said operation unit completes readiness to perform an operation on a new data set; and output register means for outputting said data set consisting of said predetermined number of pieces of data read from said data storage means by said data readout control means to said operation unit.

10. A variable-rate data entry control method for taking from a data string being transferred continuously data sets each consisting of a predetermined number of successive pieces of data for subsequent operations, comprising the steps of:

receiving pieces of data in said data string in sequence, in synchronism with the transfer rate of said data string; and extracting from said data string a new data set to be operated on in such a way that it overlaps with a data set which was operated on the last time by shifting a time window on said same data string.

11. A variable-rate data entry control method for taking from a data string being transferred continuously data sets each consisting of a predetermined number of successive pieces of data for subsequent operations, comprising the steps of:

receiving pieces of data in said data string in sequence, in synchronism with the transfer rate of said data string; and extracting, each time readiness to perform an operation on a new data is completed, from said data string a data set by shifting a time window on said same data string and consisting of said predetermined number of successive pieces of data, beginning at the position that is the number obtained by dividing said predetermined number by the ratio of the number of pieces of data which are operated on per unit time to the number of pieces of data received per unit time behind the position on said data string of the first piece of data in the last data set which was operated on prior to the completion of the readiness for operation.

12. A variable-rate data entry control method for taking from a data string being transferred continuously data sets each consisting of a predetermined number of successive pieces of data for subsequent operations, comprising the steps of:

receiving pieces of data in said data string in sequence, in synchronism with the transfer rate of said data string; and extracting the most recent data set by shifting a time window on said same data string and consisting of said predetermined number of pieces of data from said data string each time the readiness to perform an operation on a new data set is completed.

13. A variable-rate data entry control method for taking from a data string being transferred continuously data sets each consisting of a predetermined number of successive pieces of data for subsequent operations, comprising the steps of:

receiving pieces of data in said data string in sequence, in synchronism with the transfer rate of said data string;

acquiring correction data for correcting the transfer timing of said data string; and extracting, each time readiness to perform an operation on a new data set is completed, from said data string a data set by shifting a time window on said same data string and consisting of said predetermined number of successive pieces of data beginning at the position on said data string that is calculated from the position on said data string of the first piece of data in the last data set which was operated on prior to the completion of the readiness for operation, the number obtained by dividing said predetermined number by the ratio of the number of pieces of data which are operated on per unit time to the number of pieces of data which are received per unit time, and said correction data.

14. A variable-rate data entry control method for taking from a data string being transferred continuously data sets each consisting of a predetermined number of successive pieces of data for subsequent operations, comprising the steps of:

receiving pieces of data in said data string in sequence, in synchronism with the transfer rate of said data string;

storing pieces of data received;

incrementing a counter value by a value obtained by dividing said predetermined number by the ratio of the number of pieces of data which are operated on per unit time to the number of pieces of data received per unit time each time a data set consisting of said predetermined number of pieces of data is read from said pieces of data stored;

acquiring transfer timing correction data for correcting the transfer timing of said data string at regular intervals;

holding the last transfer timing correction data each time the most recent transfer timing correction data is acquired;

calculating interpolated correction data which interpolates said recent transfer timing correction data and said last transfer timing correction data from the two pieces of correction data;

adding said interpolated correction data to said counter value; and reading from said stored pieces of data a data set of a shifted time window on said same data string and consisting of said predetermined number of successive pieces of data on the basis on the result of said adding step each time readiness to perform an operation on a new data set is completed.

15. A method of synchronizing data rates between first and second devices, comprising:

receiving a data string at a first data rate as output by the first device; and outputting data at a second data rate as input by the second device, with the data output to the second device in each output cycle duplicating data output in a prior output cycle by a data overlap dependent on a ratio of the first and second data rates by shifting a time window on the same data string.

* * * * *